(12) United States Patent
Korzenski et al.

(10) Patent No.: US 9,238,850 B2
(45) Date of Patent: Jan. 19, 2016

(54) SUSTAINABLE PROCESS FOR RECLAIMING PRECIOUS METALS AND BASE METALS FROM E-WASTE

(75) Inventors: Michael B. Korzenski, Danbury, CT (US); Ping Jiang, Danbury, CT (US); James Norman, Wilmington, MA (US); John Warner, Wilmington, MA (US); Laura Ingalls, Wilmington, MA (US); Dinakar Gnanamgari, Wilmington, MA (US); Fred Strickler, Wilmington, MA (US); Ted Mendum, Wilmington, MA (US)

(73) Assignee: ADVANCED TECHNOLOGY MATERIALS, INC., Danbury, CT (US)

( * ) Notice: Subject to any disclaimer, the term of this patent is extended or adjusted under 35 U.S.C. 154(b) by 206 days.

(21) Appl. No.: 13/817,868

(22) PCT Filed: Aug. 19, 2011

(86) PCT No.: PCT/US2011/048449
§ 371 (c)(1),
(2), (4) Date: Aug. 28, 2013

(87) PCT Pub. No.: WO2012/024603
PCT Pub. Date: Feb. 23, 2012

(65) Prior Publication Data
US 2013/0336857 A1 Dec. 19, 2013

Related U.S. Application Data

(60) Provisional application No. 61/375,273, filed on Aug. 20, 2010.

(51) Int. Cl.
| | | |
|---|---|---|
| *C22B 11/00* | (2006.01) | |
| *C22B 3/00* | (2006.01) | |
| *C22B 7/00* | (2006.01) | |
| *C22B 3/26* | (2006.01) | |
| *C22B 15/00* | (2006.01) | |

(52) U.S. Cl.
CPC ............. *C22B 11/046* (2013.01); *C22B 3/0005* (2013.01); *C22B 7/006* (2013.01); *C22B 7/007* (2013.01); *C22B 15/0067* (2013.01); *C22B 15/0069* (2013.01); *C22B 15/0071* (2013.01); *Y02W 30/54* (2015.05)

(58) Field of Classification Search
None
See application file for complete search history.

(56) References Cited

U.S. PATENT DOCUMENTS

| | | | |
|---|---|---|---|
| 5,993,685 A | 11/1999 | Currie et al. | |
| 6,126,720 A | 10/2000 | Okada et al. | |
| 6,280,651 B1 | 8/2001 | Wojtczak et al. | |
| 6,322,600 B1 | 11/2001 | Brewer et al. | |
| 6,409,781 B1 | 6/2002 | Wojtczak et al. | |
| 6,492,310 B2 | 12/2002 | Wojtczak et al. | |
| 6,527,819 B2 | 3/2003 | Wojtczak et al. | |
| 6,692,546 B2 | 2/2004 | Ma et al. | |
| 6,773,873 B2 | 8/2004 | Seijo et al. | |
| 6,800,218 B2 | 10/2004 | Ma et al. | |
| 6,802,983 B2 | 10/2004 | Mullee et al. | |
| 6,875,733 B1 | 4/2005 | Wojtczak et al. | |
| 7,029,373 B2 | 4/2006 | Ma et al. | |
| 7,300,601 B2 | 11/2007 | Liu et al. | |
| 7,736,405 B2 | 6/2010 | Darsillo et al. | |
| 7,888,301 B2 | 2/2011 | Bernhard et al. | |
| 7,922,824 B2 | 4/2011 | Minsek et al. | |
| 7,960,328 B2 | 6/2011 | Visintin et al. | |
| 7,994,108 B2 | 8/2011 | Minsek et al. | |
| 8,026,200 B2 | 9/2011 | Cooper et al. | |
| 8,058,219 B2 | 11/2011 | Rath et al. | |
| 8,114,220 B2 | 2/2012 | Visintin et al. | |
| 8,236,485 B2 | 8/2012 | Minsek et al. | |
| 8,304,344 B2 | 11/2012 | Boggs et al. | |
| 8,338,087 B2 | 12/2012 | Rath et al. | |
| 2004/0179985 A1 | 9/2004 | Olper et al. | |
| 2006/0154186 A1 | 7/2006 | Minsek et al. | |
| 2006/0191376 A1* | 8/2006 | Wu | 75/353 |
| 2006/0249482 A1 | 11/2006 | Wrschka et al. | |
| 2007/0251551 A1 | 11/2007 | Korzenski et al. | |
| 2008/0125342 A1 | 5/2008 | Visintin et al. | |
| 2008/0242574 A1 | 10/2008 | Rath et al. | |
| 2009/0032766 A1 | 2/2009 | Rajaratnam et al. | |
| 2009/0212021 A1 | 8/2009 | Bernhard et al. | |
| 2009/0215269 A1 | 8/2009 | Boggs et al. | |
| 2009/0239777 A1 | 9/2009 | Angst et al. | |
| 2009/0257931 A1 | 10/2009 | Nakano et al. | |
| 2010/0065530 A1 | 3/2010 | Walker et al. | |
| 2010/0087065 A1 | 4/2010 | Boggs et al. | |
| 2010/0112728 A1 | 5/2010 | Korzenski et al. | |
| 2010/0163788 A1 | 7/2010 | Visintin et al. | |
| 2010/0176082 A1 | 7/2010 | Cooper et al. | |
| 2010/0261632 A1 | 10/2010 | Korzenski et al. | |

(Continued)

FOREIGN PATENT DOCUMENTS

| | | | |
|---|---|---|---|
| CN | 1458291 A | * | 11/2003 |
| CN | 101003857 A | | 7/2007 |

(Continued)

OTHER PUBLICATIONS

Sheng, et al., "Recovery of gold from computer circuit board scrap using aqua regia" 2007, Waste Management & Research, 25, pp. 380-383.*
English translation of KR10-2003-0006792, Jan. 2003.*
Translation of Japanese Office Action, May 22, 2015.*
International Search Report, Mar. 26, 2012.
Guang, Xue, et al; "The hydrometallurgical process extracting gold, silver copper and lead from cyaniding gold mud," Feb. 28, 2005.
Japanese Office Action dated May 22, 2015.

*Primary Examiner* — Steven Bos
(74) *Attorney, Agent, or Firm* — Tristan A. Fuierer; Moore & Van Allen, PLLC; Maggie Chappuis

(57) ABSTRACT

Processes for recycling electronic components removed from printed wire boards, whereby precious metals and base metals are extracted from the electronic components using environmentally friendly compositions. At least gold, silver and copper ions can be extracted from the electronic components and reduced to their respective metals using the processes and compositions described herein.

20 Claims, 5 Drawing Sheets

(56) References Cited

U.S. PATENT DOCUMENTS

| | | |
|---|---|---|
| 2010/0286014 A1 | 11/2010 | Barnes |
| 2011/0017020 A1 | 1/2011 | Homma et al. |
| 2011/0039747 A1 | 2/2011 | Zhou et al. |
| 2012/0015857 A1 | 1/2012 | Chen et al. |

FOREIGN PATENT DOCUMENTS

| | | |
|---|---|---|
| CN | 101100706 A | 1/2008 |
| DE | 253048 A1 | 1/1988 |
| JP | H11229052 A | 8/1999 |
| JP | 2005154892 A | 6/2005 |
| JP | 2009197321 A | 9/2009 |
| KR | 1020010067641 A | 7/2001 |
| KR | 1020030006792 A | 1/2003 |
| WO | 9858089 A1 | 12/1998 |
| WO | 2006110645 A2 | 10/2006 |
| WO | 2007027522 A2 | 3/2007 |
| WO | 2009073596 A2 | 6/2009 |
| WO | 2009087908 A1 | 7/2009 |
| WO | 2010017160 A2 | 2/2010 |
| WO | 2010086745 A1 | 8/2010 |
| WO | 2010091045 A2 | 8/2010 |
| WO | 2011056948 A2 | 5/2011 |
| WO | 2011130622 A1 | 10/2011 |
| WO | 2012009639 A2 | 1/2012 |
| WO | 2012024300 A2 | 2/2012 |
| WO | 2012051380 A2 | 4/2012 |
| WO | 2012097143 A2 | 7/2012 |

* cited by examiner

SUSTAINABLE PROCESS FOR RECLAIMING PRECIOUS METALS AND BASE METALS FROM E-WASTE

CROSS-REFERENCE TO RELATED APPLICATIONS

This application is filed under the provisions of 35 U.S.C. §371 and claims the priority of International Patent Application No. PCT/US11/48449 filed on 19 Aug.,2011 and entitled "Sustainable Process for Reclaiming Precious Metals and Base Metals from E-waste" in the name of Michael B. Korzenski, et al., which claims priority to U.S. Provisional Patent Application No. 61/375,273 filed on 20 Aug. 2010, both of which are hereby incorporated herein by reference in their entireties.

FIELD

The present invention relates generally to environmentally friendly processes for recycling printed wire boards, more specifically environmentally friendly processes for extracting the precious metals and base metals from IC chips and other materials comprising said metals.

DESCRIPTION OF THE RELATED ART

Disposal of used electronic equipment, parts, and components, including obsolete or damaged computers, computer monitors, television receivers, cellular telephones, MP3 players, and similar products, is increasing at a rapid rate. It is recognized that there are significant hazards to living things and to the environment generally when electronic equipment is dumped in landfills. Equally, it is understood that improper disassembly poses appreciable risks to the health and safety of people performing disassembly manually.

Printed wire boards (PWB's) are a common component of many electronic systems. PWB's are typically manufactured by laminating dry film on clean copper foil, which is supported on a fiberglass plate matrix. The film is exposed with a film negative of the circuit board design, and an etcher is used to remove unmasked copper foil from the plate. Solder is then applied over the unetched copper on the board. Depending upon the use and design of the particular PWB, various other metals may be used in the manufacturing process, including lead, tin, nickel, iron, zinc, aluminum, silver, gold, platinum, and mercury. The PWB's include many additional components, for example, transistors, capacitors, heat sinks, IC's, resistors, integrated switches, processors, etc.

PWB's are potentially a difficult waste material to process since they generally have little usefulness once they are removed from the electrical component in which they were installed. In addition, they typically consist of materials that classify them as a hazardous or "special" waste stream. They must be segregated and handled separately from other non-hazardous solid waste streams. PWB's that are handled as waste materials must be processed using any one of several available disposal options. Not only are these options expensive, they require a significant amount of effort and handling by the generator. Furthermore, since some of these disposal options do not include destruction of the waste circuit boards, the generator also retains much of the liability associated with improper handling or disposal.

Different methods have been suggested to try to combat the waste of raw materials and environmental pollution through the ever increasing load of scrap electronic waste. As far as PWB's are concerned the main problem remains in the fact that different materials are either glued, soldered or stuck together. Methods requiring a high energy demand are needed to separate the materials so that they can be recycled. Presently, these methods involve shredding the PWB's into an equipped, partly equipped and unequipped state. With regards to shredding, the first two cases are a cause of concern when considering the environment. In the last case the components can be removed by de-soldering, planing down, chiselling off, grinding down, wet chemical processing (e.g., aqua regia, cyanide, etc.) or other similar processes. After this, the PWB's or pieces thereof are burnt in metallurgy works. In this process the base material, made up of glass fibre and plastic or similar such materials, is also burnt. The melting down process of the PWB's causes the energy requirement to be high. Refining the melted down metals also requires further high energy and environmentally unfriendly processes such as smelting.

The processes described herein are useful for recycling electronic waste and for recovering valuable and/or hazardous metals therefrom. The processes provide an alternative to smelting for the recovery of valuable and/or hazardous metals present in electronic waste.

SUMMARY

In one aspect, a method of removing more than one metal from e-waste is described, said method comprising:
(a) contacting the e-waste with a first metal digestion composition to form a first extraction liquid and a first extraction solid;
(b) separating the first extraction solid from the first extraction liquid;
(c) contacting the first extraction solid with a second metal digestion composition to form a second extraction liquid and a second extraction solid;
(d) separating the second extraction solid from the second extraction liquid, wherein the second extraction liquid comprises first metal ions; and
(e) contacting the first extraction liquid with an additive to separate second metal ions from third metal ions.

Preferably, the first extraction liquid comprises at least one chelating agent, at least one oxidizing agent, and at least one catalyst. Preferably, the second extraction liquid comprises at least one chelating agent, at least one oxidizing agent, and at least one catalyst. It should be appreciated by the skilled artisan that the first extraction liquid can be the same as or different from the second extraction liquid. In a preferred embodiment, the first metal comprises gold, the second metal comprises silver and the third metal comprises copper.

In another aspect, a method of removing more than one metal from e-waste is described, said method comprising:
(a) contacting the e-waste with a first metal digestion composition to form a first extraction liquid and a first extraction solid;
(b) separating the first extraction solid from the first extraction liquid;
(c) contacting the first extraction solid with a second metal digestion composition to form a second extraction liquid and a second extraction solid;
(d) separating the second extraction solid from the second extraction liquid, wherein the second extraction liquid comprises first metal ions; and
(e) contacting the first extraction liquid with a pH adjusting agent to separate second metal ions from third metal ions.

Preferably, the first extraction liquid comprises at least one chelating agent, at least one oxidizing agent, and at least one catalyst. Preferably, the second extraction liquid comprises at least one chelating agent, at least one oxidizing agent, and at least one catalyst. It should be appreciated by the skilled artisan that the first extraction liquid can be the same as or different from the second extraction liquid. In a preferred embodiment, the first metal comprises gold, the second metal comprises silver and the third metal comprises copper.

In still another aspect, a method of removing more than one metal from e-waste is described, said method comprising:
(a) contacting the e-waste with a first metal digestion composition to form a first extraction liquid and a first extraction solid;
(b) separating the first extraction solid from the first extraction liquid;
(c) contacting the first extraction solid with a second metal digestion composition to form a second extraction liquid and a second extraction solid;
(d) separating the second extraction solid from the second extraction liquid, wherein the second extraction liquid comprises first metal ions; and
(e) contacting the first extraction liquid with an organic component that is immiscible with the first extraction liquid to separate second metal ions from third metal ions.

Preferably, the first extraction liquid comprises at least one chelating agent, at least one oxidizing agent, and at least one catalyst. Preferably, the second extraction liquid comprises at least one chelating agent, at least one oxidizing agent, and at least one catalyst. It should be appreciated by the skilled artisan that the first extraction liquid can be the same as or different from the second extraction liquid. In a preferred embodiment, the first metal comprises gold, the second metal comprises silver and the third metal comprises copper.

In yet another embodiment, a method of removing metals from e-waste, said method comprising:
(a) contacting the e-waste with a composition to extract at least two metal ions from said e-waste;
(b) separating the at least two metal ions extracted from the e-waste into individual metal ion fractions; and
(c) reducing each fraction of metal ions to solid metals.

Other aspects, features and advantages will be more fully apparent from the ensuing disclosure and appended claims.

DETAILED DESCRIPTION AND PREFERRED EMBODIMENTS THEREOF

Figure 1:
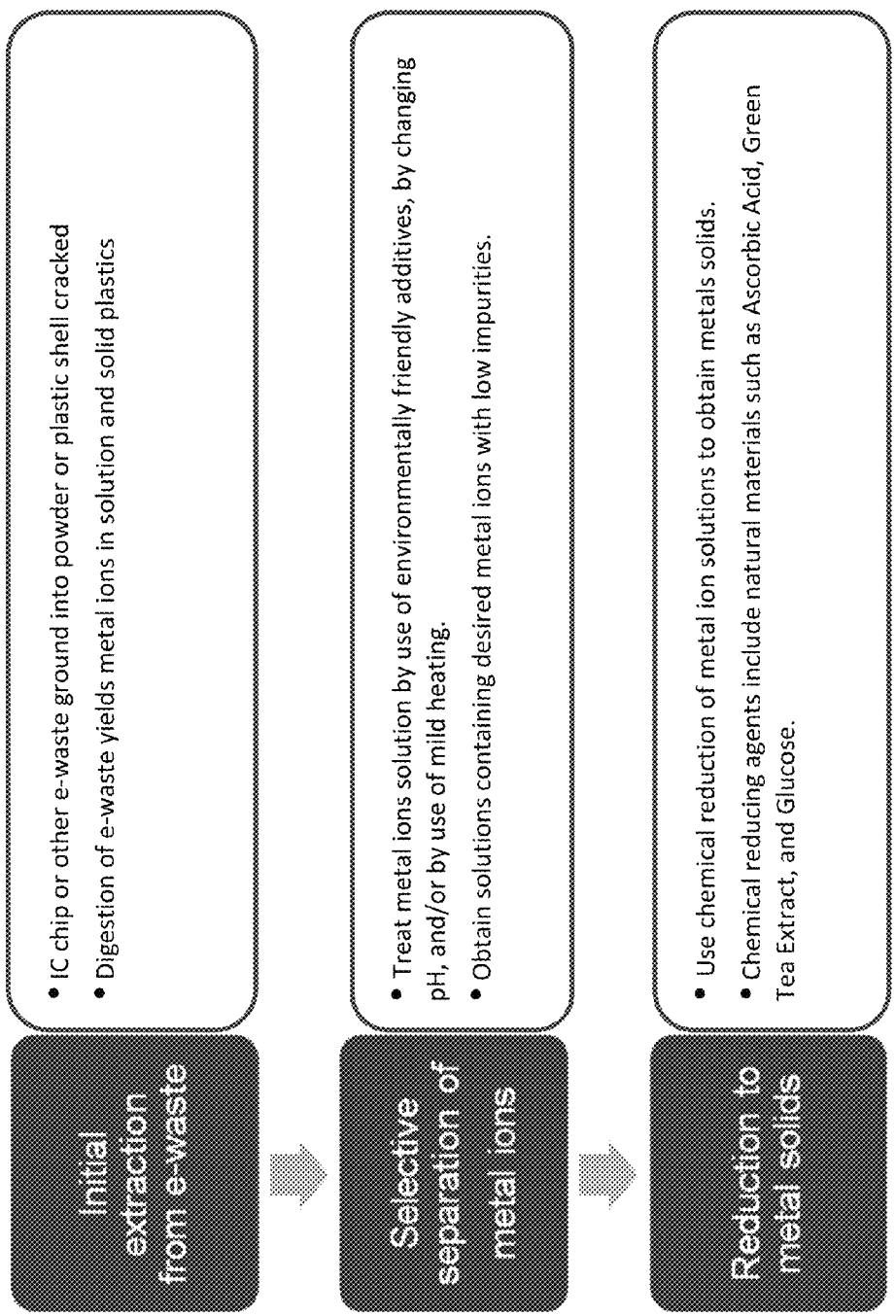
FIG. 1 illustrates the generic separation process described herein.

The present invention relates generally to environmentally friendly processes to recycle printed wire boards, more specifically, environmentally friendly processes to recycle components removed from the printed wire boards.

For the purposes of the present disclosure, "electronic waste" or "e-waste" corresponds to computers, computer monitors, television receivers, cellular telephones, video cameras, digital cameras, DVD players, video game consoles, facsimile machines, copiers, MP3 players, and similar products that have reached the end of their useful life or otherwise have been disposed of. Electronic waste or e-waste includes the components contained within these well known items such as printed wire boards and the components contained thereon (e.g., transistors, capacitors, heat sinks, integrated circuits (IC's), resistors, integrated switches, chips, and processors).

As used herein, "metals" correspond to precious metals and base metals that are preferably extracted from the components removed from the printed wire boards.

As used herein, "precious metals" include the metals such as gold, silver, platinum, palladium, alloys comprising same, and combinations thereof.

As used herein, "base metals" corresponds to iron, nickel, lead, zinc, alloys comprising same, and combinations thereof. Although not base metals per se, for the purposes of the present invention, the base metals further include copper, manganese, tin, antimony, aluminum, as well as alloys comprising same, and combinations thereof.

"Substantially devoid" is defined herein as less than 2 wt. %, preferably less than 1 wt. %, more preferably less than 0.5 wt. %, and most preferably less than 0.1 wt. %. "Devoid" corresponds to 0 wt. %.

As used herein, "about" is intended to correspond to ±5% of the stated value.

As defined herein, "complexing agent" includes those compounds that are understood by one skilled in the art to be complexing agents, chelating agents, sequestering agents, and combinations thereof. Complexing agents will chemically combine with or physically hold the metal atom and/or metal ion to be removed using the compositions described herein.

For the purposes of the present description, "printed wire boards" and "printed circuit boards" are synonymous and may be used interchangeably.

For the purposes of the present description, "PWB components" include, but are not limited to, transistors, capacitors, heat sinks, IC's, resistors, integrated switches, chips, and processors.

As used herein, the term "releases" corresponds to the complete removal of the component(s) from the PWB component or the partial release of the component(s) from the PWB component, wherein the partial release of the component from the PWB corresponds to the weakening of the solder holding the component(s) to the PWB and the remainder of the release may be carried out by another method.

As used herein, "substantially separate" corresponds to the separation of a first metal from a material or composition comprising at least two metals, wherein at least 75 wt % of the first metal is separated from the material or composition, preferably at least 85 wt %, even more preferably at least 90 wt %, and most preferably at least 95 wt % of the first metal is separated from the material or composition.

Compositions may be embodied in a wide variety of specific formulations, as hereinafter more fully described. In all such compositions, wherein specific components of the composition are discussed in reference to weight percentage ranges including a zero lower limit, it will be understood that such components may be present or absent in various specific embodiments of the composition, and that in instances where such components are present, they may be present at concentrations as low as 0.001 weight percent, based on the total weight of the composition in which such components are employed.

In co-pending provisional patent applications 61/362,118 filed on Jul. 7, 2010 and 61/368,360 filed on Jul. 28, 2010, both entitled "Processes for Reclaiming Precious Metals and Copper From Printed Wire Boards," both of which are incorporated by reference herein in their entireties, a method of removing solder from a surface was described (e.g., a method of removing lead and/or tin-containing solder from a printed wire board (PWB)). With the removal of the solder, the components on the PWB are released and said components may be separated into those that are recyclable and those that may be further processed for disposal, reclamation of useful materials, etc. The present disclosure relates to the reclamation of materials from the PWB components that must be further processed. It should be appreciated that the present disclosure relates to the reclamation of materials from PWB components regardless of how they are obtained (e.g., de-soldering, planing down, chiselling off, grinding down, wet chemical processing or using some other method known in the art).

In a first aspect, a method of removing metals from e-waste is described and illustrated generally in FIG. 1, said method comprising:
(a) contacting the e-waste with a composition to extract at least two metal ions from said e-waste;
(b) separating the at least two metal ions extracted from the e-waste into individual metal ion fractions; and
(c) reducing each fraction of metal ions to individual solid metals.

Figure 2:
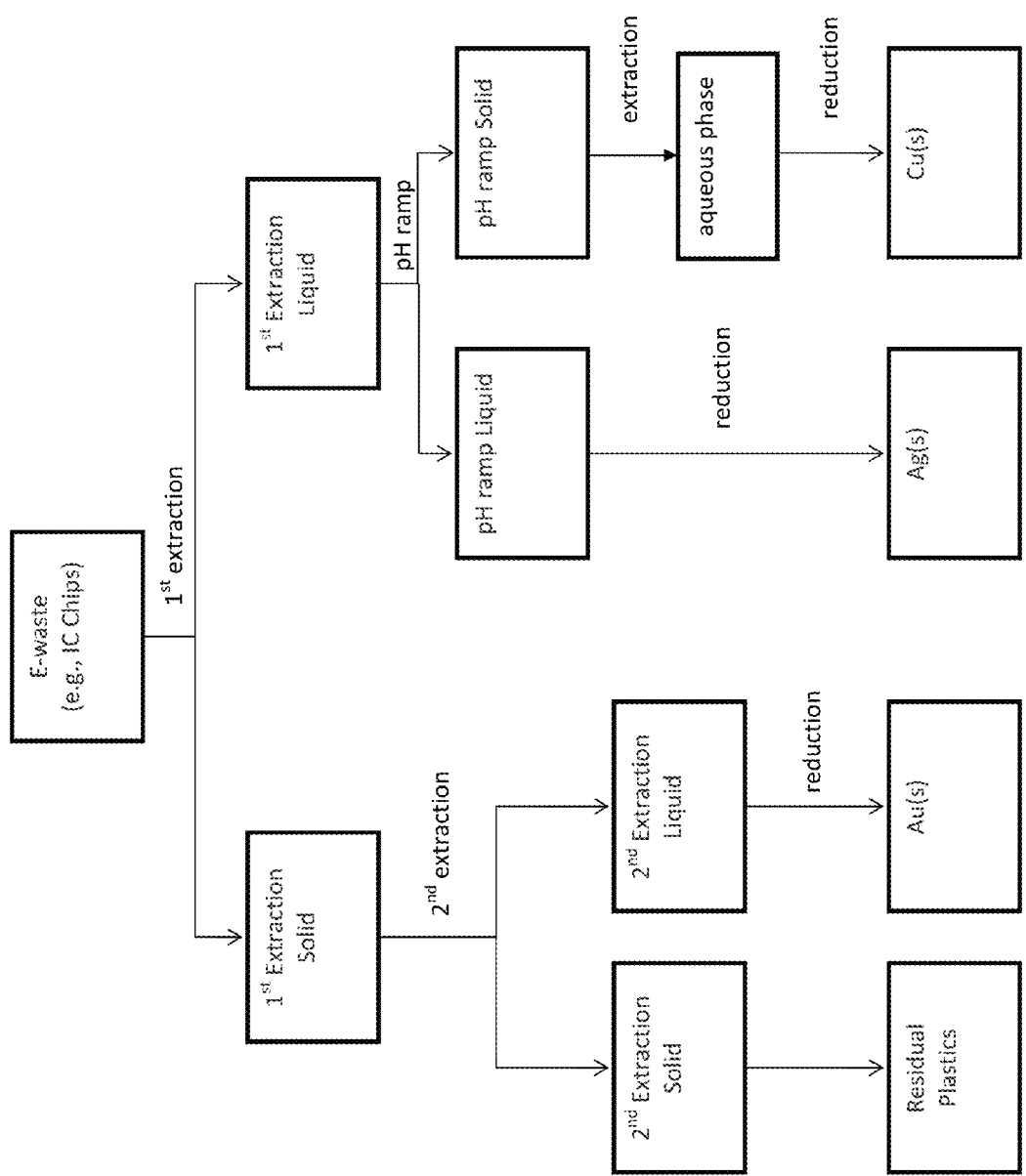
FIG. 2 illustrates schematically the separation process wherein the additive is a pH adjusting agent.
Figure 3:
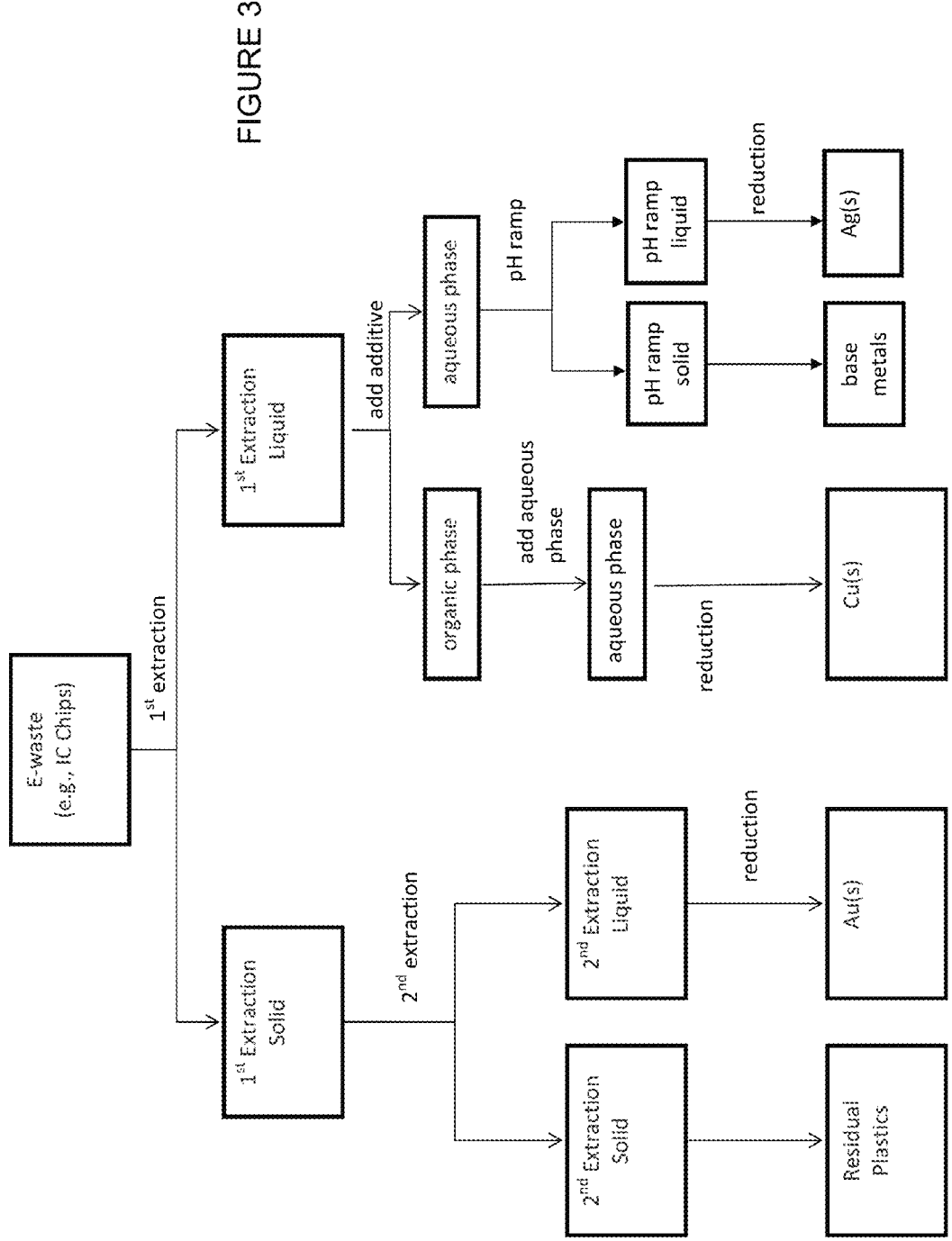
FIG. 3 illustrates schematically the separation process wherein the additive is an organic component.

In one embodiment, a method of removing more than one metal from e-waste is described and illustrated in FIGS. 2 and 3, said method comprising:
(a) contacting the e-waste with a first metal digestion composition to form a first extraction liquid and a first extraction solid;
(b) separating the first extraction solid from the first extraction liquid;
(c) contacting the first extraction solid with a second metal digestion composition to form a second extraction liquid and a second extraction solid;
(d) separating the second extraction solid from the second extraction liquid, wherein the second extraction liquid comprises first metal ions; and
(e) contacting the first extraction liquid with an additive to separate second metal ions from third metal ions.

In another embodiment, a method of removing more than one metal from e-waste is described and illustrated in FIGS. 2 and 3, said method comprising:
(a) contacting the e-waste with a first metal digestion composition to form a first extraction liquid and a first extraction solid;
(b) separating the first extraction solid from the first extraction liquid;
(c) contacting the first extraction solid with a second metal digestion composition to form a second extraction liquid and a second extraction solid;
(d) separating the second extraction solid from the second extraction liquid, wherein the second extraction liquid comprises first metal ions;
(e) contacting the first extraction liquid with an additive to separate second metal ions from third metal ions; and
(f) reducing the first metal ions to a first metal, the second metal ions to a second metal, and the third metal ions to a third metal.

The e-waste can be pulverized into a powder, shredded into pieces, crushed, or in any other form so long as the metals contained in the e-waste are readily exposed for extraction from the e-waste. As defined herein, "crushed" e-waste corresponds to any method that substantially exposes the gold and other precious metals of the e-waste (e.g., PWB component) to the extraction composition, e.g., cracking, pulverizing or shredding the e-waste. Preferably, the e-waste is cracked, thereby minimizing the amount of gold or other precious metals lost as a result of the pulverizing or shredding. Precious metals can be lost if scrap is pulverized wherein gold dust adheres to the separated stream and is lost in the magnetic fraction. Accordingly, crushing is further defined as a process whereby no more than 10% of the gold or other precious metals are lost to processes such as pulverizing or shredding, preferably no more than 5%, even more preferably no more than 2%. Moreover, crushing the e-waste minimizes the risk to human health by minimizing the release of dusts containing hazardous metals and brominated flame retardants.

In one embodiment, the first metal digestion composition comprises, consists of, or consists essentially of at least one oxidizing agent and at least one complexing agent. In another embodiment, the first metal digestion composition comprises, consists of, or consists essentially of at least one oxidizing agent, at least one complexing agent, and at least one catalyst. The first metal digestion composition is preferably more environmentally friendly than aqua regia or cyanide-containing compositions. Further, the first metal digestion composition preferably is formulated to substantially separate a first metal or metal ion from the e-waste into a fraction that can be further processed to reclaim said metal. For example, in one embodiment, the first metal digestion composition can be used to separate gold from other precious and base metals, wherein the gold is present in the solid and the other precious and base metals are dissolved in the first metal digestion composition. For example, the gold and polymeric material can be present in the first extraction solid while the first extraction liquid comprises precious metals other than gold and other base metals.

In first extraction application, the first metal digestion composition as described herein is contacted in any suitable manner to the e-waste, e.g., by spraying the composition on the e-waste, by dipping (in a volume of the composition) of the e-waste, by contacting the e-waste with another material, e.g., a pad, or fibrous sorbent applicator element, that has the composition absorbed thereon, or by any other suitable means, manner or technique, by which a composition is brought into contact with the e-waste. The first extraction process using the first metal digestion composition may be static or dynamic. Preferably, the process is dynamic whereby agitation and/or ultrasonics occurs.

In use of the first metal digestion composition, the composition typically is contacted with the e-waste for a time of from about 10 minutes to about 200 minutes, preferably about 30 min to 135 min, at temperature in a range of from about 20° C. to about 70° C., preferably in a range from about 20° C. to about 50° C. Such contacting times and temperatures are illustrative, and any other suitable time and temperature conditions may be employed that are efficacious to separate a first metal or metal ion from the e-waste into a fraction that can be further processed to reclaim said metal.

Oxidizing agents are included in the composition to oxidize the metals to be removed into an ionic form. Oxidizing agents contemplated herein include, but are not limited to, methanesulfonic acid (MSA), ethanesulfonic acid, benzenesulfonic acid, 2-hydroxyethanesulfonic acid, cyclohexylaminosulfonic acid, n-propanesulfonic acid, n-butanesulfonic acid, or n-octanesulfonic acid, hydrogen peroxide ($H_2O_2$), $FeCl_3$ (both hydrated and unhydrated), oxone ($2KHSO_5.KHSO_4.K_2SO_4$), ammonium polyatomic salts (e.g., ammonium peroxomonosulfate, ammonium chlorite ($NH_4ClO_2$), ammonium chlorate ($NH_4ClO_3$), ammonium iodate ($NH_4IO_3$), ammonium perborate ($NH_4BO_3$), ammonium perchlorate ($NH_4ClO_4$), ammonium periodate ($NH_4IO_3$), ammonium persulfate (($NH_4)_2S_2O_8$), ammonium hypochlorite ($NH_4ClO$)), sodium polyatomic salts (e.g., sodium persulfate ($Na_2S_2O_8$), sodium hypochlorite (NaClO)), potassium polyatomic salts (e.g., potassium iodate ($KIO_3$), potassium permanganate ($KMnO_4$), potassium persulfate, nitric acid ($HNO_3$), potassium persulfate ($K_2S_2O_8$), potassium hypochlorite (KClO)), tetramethylammonium polyatomic salts (e.g., tetramethylammonium chlorite ((N($CH_3)_4$)$ClO_2$), tetramethylammonium chlorate ((N($CH_3)_4$)$ClO_3$), tetramethylammonium iodate ((N($CH_3)_4$)$IO_3$), tetramethylammonium perborate ((N($CH_3)_4$)$BO_3$), tetramethylammonium perchlorate ((N($CH_3)_4$)$ClO_4$), tetramethylammonium periodate ((N($CH_3)_4$)$IO_4$), tetramethylammonium persulfate ((N($CH_3)_4$)$S_2O_8$)), tetrabutylammonium polyatomic salts (e.g., tetrabutylammonium peroxomonosulfate), peroxomonosulfuric acid, ferric nitrate (Fe($NO_3)_3$), urea hydrogen peroxide ((CO($NH_2)_2)H_2O_2$), peracetic acid ($CH_3$(CO)OOH), sodium nitrate, potassium nitrate, ammonium nitrate, 4-methoxybenzenesulfonic acid, 4-hydroxybenzenesulfonic acid, 4-aminobenzenesulfonic acid, 4-nitrobenzenesulfonic acid, toluenesulfonic acid, hexylbenzenesulfonic acid, heptylbenzenesulfonic acid, octylbenzenesulfonic acid, nonylbenzenesulfonic acid, decylbenzenesulfonic acid, undecylbenzenesulfonic acid, dodecylbenzenesulfonic acid, tridecylbenzenesulfonic acid, tetradecylbenzene sulfonic acid, hexadecylbenzene sulfonic acid, 3-nitrobenzenesulfonic acid, 2-nitrobenzenesulfonic acid, 2-nitronaphthalenesulfonic acid, 3-nitronaphthalenesulfonic acid, 2,3-dinitrobenzenesulfonic acid, 2,4-dinitrobenzenesulfonic acid, 2,5-dinitrobenzenesulfonic acid, 2,6-dinitrobenzenesulfonic acid, 3,5-dinitrobenzenesulfonic acid, 2,4,6-trinitrobenzenesulfonic acid, 3-aminobenzenesulfonic acid, 2-aminobenzenesulfonic acid, 2-aminonaphthalenesulfonic acid, 3-aminonaphthalenesulfonic acid, 2,3-diaminobenzenesulfonic acid, 2,4-diaminobenzenesulfonic acid, 2,5-diaminobenzenesulfonic acid, 2,6-diaminobenzenesulfonic acid, 3,5-diaminobenzenesulfonic acid, 2,4,6-triaminobenzenesulfonic acid, 3-hydroxybenzenesulfonic acid, 2-hydroxybenzenesulfonic acid, 2-hydroxynaphthalenesulfonic acid, 3-hydroxynaphthalenesulfonic acid, 2,3-dihydroxybenzenesulfonic acid, 2,4-dihydroxybenzenesulfonic acid, 2,5-dihydroxybenzenesulfonic acid, 2,6-dihydroxybenzenesulfonic acid, 3,5-dihydroxybenzenesulfonic acid, 2,3,4-trihydroxybenzene sulfonic acid, 2,3,5-trihydroxybenzenesulfonic acid, 2,3,6-trihydroxybenzenesulfonic acid, 2,4,5-trihydroxybenzenesulfonic acid, 2,4,6-trihydroxybenzene sulfonic acid, 3,4,5-trihydroxybenzene sulfonic acid, 2,3,4,5-tetrahydroxybenzenesulfonic acid, 2,3,4,6-tetrahydroxybenzene sulfonic acid, 2,3,5,6-tetrahydroxybenzenesulfonic acid, 2,4,5,6-tetrahydroxybenzenesulfonic acid, 3-methoxybenzenesulfonic acid, 2-methoxybenzenesulfonic acid, 2,3-dimethoxybenzenesulfonic acid, 2,4-dimethoxybenzenesulfonic acid, 2,5-dimethoxybenzenesulfonic acid, 2,6-dimethoxybenzenesulfonic acid, 3,5-dimethoxybenzenesulfonic acid, 2,4,6-trimethoxybenzenesulfonic acid, and combinations thereof. The oxidizing agent may be introduced to the first composition at the manufacturer, prior to introduction of the first composition to the PWB, or alternatively at the PWB, i.e., in situ. Preferably, the oxidizing agent comprises a peroxide compound such as hydrogen peroxide.

The complexing agents are included to complex the ions produced by the oxidizing agent. Complexing agents contemplated herein include, but are not limited to: β-diketonate compounds such as acetylacetonate, 1,1,1-trifluoro-2,4-pentanedione, and 1,1,1,5,5,5-hexafluoro-2,4-pentanedione; carboxylates such as formate and acetate and other long chain carboxylates; and amides (and amines), such as bis(trimethylsilylamide) tetramer. Additional chelating agents include amines and amino acids (i.e. glycine, serine, proline, leucine, alanine, asparagine, aspartic acid, glutamine, valine, and lysine), citric acid, acetic acid, maleic acid, oxalic acid, malonic acid, succinic acid, phosphonic acid, phosphonic acid derivatives such as hydroxyethylidene diphosphonic acid (HEDP), 1-hydroxyethane-1,1-diphosphonic acid, nitrilotris(methylenephosphonic acid), nitrilotriacetic acid, iminodiacetic acid, etidronic acid, ethylenediamine, ethylenediaminetetraacetic acid (EDTA), and (1,2-cyclohexylenedinitrilo)tetraacetic acid (CDTA, uric acid, tetraglyme, pentamethyldiethylenetriamine (PMDETA), 1,3,5-triazine-2,4,6-thithiol tris odium salt solution, 1,3,5-triazine-2,4,6-thithiol triammonium salt solution, sodium diethyldithiocarbamate, disubstituted dithiocarbamates ($R^1$($CH_2CH_2O)_2NR^2CS_2Na$) with one alkyl group ($R^2$=hexyl, octyl, deceyl or dodecyl) and one oligoether ($R^1$($CH_2CH_2O)_2$, where $R^1$=ethyl or butyl), ammonium sulfate, monoethanolamine (MEA), Dequest 2000, Dequest 2010, Dequest 2060s, diethylenetriamine pentaacetic acid, propylenediamine tetraacetic acid, 2-hydroxypyridine 1-oxide, ethylenediamine disuccinic acid (EDDS), N-(2-hydroxyethyl) iminodiacetic acid (HEIDA), sodium triphosphate penta basic, sodium and ammonium salts thereof, ammonium chloride, ammonium sulfate, hydrochloric acid, sulfuric acid, and combinations thereof. Preferably, the complexing agent comprises hydrochloric acid or sulfuric acid.

The catalyst is added to enhance the removal rate of the metal(s) from the e-waste. Preferably, the catalyst comprises a glycol or a glycol ether selected from the group consisting of ethylene glycol, propylene glycol, butylene glycol, dipropylene glycol, diethylene glycol monomethyl ether, triethylene glycol monomethyl ether, diethylene glycol monoethyl ether, triethylene glycol monoethyl ether, ethylene glycol monopropyl ether, ethylene glycol monobutyl ether, diethylene glycol monobutyl ether (DEGBE), triethylene glycol monobutyl ether, ethylene glycol monohexyl ether, diethylene glycol monohexyl ether, ethylene glycol phenyl ether, propylene glycol methyl ether, dipropylene glycol methyl ether (DPGME), tripropylene glycol methyl ether, dipropylene glycol dimethyl ether, dipropylene glycol ethyl ether, propylene glycol n-propyl ether, dipropylene glycol n-propyl ether (DPGPE), tripropylene glycol n-propyl ether, propylene glycol n-butyl ether, dipropylene glycol n-butyl ether, tripropylene glycol n-butyl ether, propylene glycol phenyl ether, and combinations thereof. Most preferably, the catalyst comprises diethylene glycol monobutyl ether, propylene glycol, dipropylene glycol n-butyl ether, and combinations thereof. Most preferably, the catalyst comprises DEGBE. When included, the amount of catalyst is in a range from about 0.01 wt % to about 10 wt %, preferably about 0.1 wt % to about 5 wt %, and most preferably about 0.5 wt % to about 1 wt %. Although not wishing to be bound by theory, it is thought that by changing the chain length of the catalyst (e.g., methyl versus butyl), that the selectivity of the first extraction composition for certain metals can be varied.

Preferably, in one embodiment, the first metal digestion composition comprises, consists of, or consists essentially of hydrochloric acid and hydrogen peroxide. In another embodiment, the first metal digestion composition comprises, consists of, or consists essentially of hydrochloric acid, hydrogen peroxide, and a glycol or glycol ether. In yet another embodiment, the first metal digestion composition comprises, consists of, or consists essentially of hydrochloric acid, hydrogen peroxide, and diethylene glycol monobutyl ether. The first metal digestion composition is substantially devoid of nitric acid and cyanide-containing components. Preferably, the first metal digestion compositions are water soluble, non-corrosive, non-flammable and of low toxicity.

As illustrated in FIGS. 2 and 3, following the first extraction with the first metal digestion composition, there can be a first extraction solid and a first extraction liquid. As introduced hereinabove, the first metal digestion composition preferably is formulated to substantially separate a first metal or metal ion from the e-waste into a fraction that can be further processed to reclaim said first metal. For example, in one embodiment, the first metal digestion composition can be used to separate gold from other precious and base metals. As illustrated in FIGS. 2 and 3, the first extraction solid can comprise gold, while the first extraction liquid can comprise ions of other precious and base metals (e.g., silver and copper).

Following the first extraction, the first extraction solid can be separated from the first extraction liquid using methods well known in the art (e.g., filtration means, centrifugation and decanting, etc.).

As illustrated in FIGS. 2 and 3, once the first extraction solid is obtained, a second extraction can commence, wherein a second metal digestion composition is combined with the first extraction solid which comprises a first metal (e.g., gold). The second metal digestion composition can be the same as or different from the first metal digestion composition. Preferably, the second metal digestion composition is the same as the first metal digestion composition, wherein the time and/or temperature of contacting of the first metal digestion composition with the e-waste is different than the time and/or temperature of contacting of the second metal digestion composition with the first extraction solid, as will be clarified in the examples herein.

In second extraction application, the second metal digestion composition as described herein is contacted in any suitable manner to the first extraction solid, e.g., by spraying the composition on the first extraction solid, by dipping (in a volume of the composition) of the first extraction solid, by contacting the first extraction solid with another material, e.g., a pad, or fibrous sorbent applicator element, that has the composition absorbed thereon, or by any other suitable means, manner or technique, by which a composition is brought into contact with the first extraction solid. The second extraction process using the second metal digestion composition may be static or dynamic. Preferably, the process is dynamic whereby agitation and/or ultrasonics occurs.

In use of the second metal digestion composition, the composition typically is contacted with the first extraction solid for a time of from about 10 minutes to about 200 minutes, preferably about 30 min to 135 min, at temperature in a range of from about 20° C. to about 70° C., preferably in a range from about 20° C. to about 50° C. Such contacting times and temperatures are illustrative, and any other suitable time and temperature conditions may be employed that are efficacious to separate a first metal ion from the first extraction solid into a fraction that can be further processed to reclaim said metal.

In one embodiment, the second metal digestion composition comprises, consists of, or consists essentially of at least one oxidizing agent and at least one complexing agent. In another embodiment, the second metal digestion composition comprises, consists of, or consists essentially of at least one oxidizing agent, at least one complexing agent, and at least one catalyst. The second metal digestion composition is preferably more environmentally friendly than, and is substantially devoid of, nitric acid and cyanide-containing compositions. Further, the second metal digestion composition preferably is formulated to substantially separate the first metal ion from the first extraction solid into a fraction (e.g., an aqueous fraction) that can be further processed to reclaim said metal. For example, in one embodiment, the second metal digestion composition can be used to separate gold ions from the first extraction solid, wherein the second extraction solid comprises polymeric material. The oxidizing agents, complexing agents and catalysts are the same as described hereinabove.

As illustrated in FIGS. 2 and 3, following the second extraction with the second metal digestion composition, there can be a second extraction solid and a second extraction liquid. As introduced hereinabove, the second metal digestion composition preferably is formulated to substantially separate the first metal ion (e.g., gold) from the first extraction solid into a fraction (e.g., the second extraction liquid) that can be further processed to reclaim said metal. For example, in one embodiment, the second metal digestion composition can be used to separate gold ions from the first extraction solid. As illustrated in FIGS. 2 and 3, the second extraction liquid can comprise gold ions, while the second extraction solid can comprise residual plastics. It should be appreciated by the skilled artisan that the residual plastics may be disposed of or alternatively, recycled or reclaimed for reuse. Following the extraction of the metal ions into the second extraction liquid, the metal can be obtained by reducing the metal ions, as will be discussed at length hereinbelow.

Following separation of the first extraction solid from the first extraction liquid, an additive can be added to further separate metals that are present in the first extraction liquid. The additive can be a pH adjusting agent or an organic phase such that upon addition of the additive to the first extraction liquid, a second metal ion is separated from a third metal ion based using precipitation or separation. Alternatively, or in addition to the addition of the pH adjusting agent or organic additive, the temperature of the contacting conditions can be varied.

It is known in the art that some metal ions readily form hydroxide solids as the pH of a solution is raised. Accordingly, in one embodiment, the additive is a pH adjusting agent wherein the pH of the first extraction liquid is raised to a pH in a range from about 6 to about 12, preferably about 9 to about 11, to separate a second metal ion from the first extraction liquid. pH adjusting agents contemplated herein preferably include hydroxide ions such as alkali and alkaline earth metal hydroxides such as sodium hydroxide, potassium hydroxide, rubidium hydroxide, cesium hydroxide, magnesium hydroxide, calcium hydroxide, strontium hydroxide, or barium hydroxide. Alternatively, the pH adjusting agents can include quaternary ammonium bases having the formula $[NR^1R^2R^3R^4]^+OH^-$, wherein $R^1$, $R^2$, $R^3$ and $R^4$ can be the same as or different from one another and are selected from the group consisting of hydrogen, straight-chained or branched $C_1$-$C_6$ alkyls (e.g., methyl, ethyl, propyl, butyl, pentyl, hexyl), $C_6$-$C_{10}$ aryls (e.g., benzyl), and combinations thereof. The addition of the pH adjusting agent to the first extraction liquid preferably substantially separates a second metal ion from the first extraction liquid into a fraction that can be further processed to reclaim said metal. For example, as illustrated in FIG. 2, following the pH ramp to a range of about 6 to about 12, preferably about 9 to about 11, a precipitate (the "pH ramp solid") comprising metal hydroxides will form, said precipitate being readily separable from the remaining liquid comprising the second metal ion (the "pH ramp liquid"). The pH ramp solid can be separated from the pH ramp liquid using methods well known in the art (e.g., filtration means, centrifugation and decanting, etc.). For example, the second metal ions in the pH ramp liquid can comprise silver ions, which are substantially separable from other metals in the first extraction liquid which readily formed hydroxide solids in the presence of a pH adjusting agent. The pH ramp liquid comprising silver ions can be reduced to silver metal in a subsequent step to be discussed below.

The pH ramp solid remaining subsequent to separation from the pH ramp liquid can comprise several metals, most notably copper, in the form of metal hydroxide salts. The copper ions can subsequently be extracted from the pH ramp solid into an aqueous phase, followed by reduction to copper metal. For example, the copper ions can be extracted from the solid using a dilute sulfuric acid solution.

Accordingly, another embodiment relates to a method of removing more than one metal from e-waste as illustrated in FIG. 2, said method comprising:
(a) contacting the e-waste with a first metal digestion composition to form a first extraction liquid and a first extraction solid;
(b) separating the first extraction solid from the first extraction liquid;
(c) contacting the first extraction solid with a second metal digestion composition to form a second extraction liquid and a second extraction solid;
(d) separating the second extraction solid from the second extraction liquid, wherein the second extraction liquid comprises first metal ions; and
(e) contacting the first extraction liquid with a pH adjusting agent to separate second metal ions from third metal ions.

Still another embodiment relates to a method of removing more than one metal from e-waste as illustrated in FIG. 2, said method comprising:
(a) contacting the e-waste with a first metal digestion composition to form a first extraction liquid and a first extraction solid;
(b) separating the first extraction solid from the first extraction liquid;
(c) contacting the first extraction solid with a second metal digestion composition to form a second extraction liquid and a second extraction solid;
(d) separating the second extraction solid from the second extraction liquid, wherein the second extraction liquid comprises first metal ions;
(e) contacting the first extraction liquid with a pH adjusting agent to separate second metal ions from third metal ions; and
(f) reducing the first metal ions to a first metal, the second metal ions to a second metal, and the third metal ions to a third metal.

In another embodiment, the additive is an organic component which is added to the first extraction liquid to separate a metal ion (e.g., the second metal ions) from another metal ion (e.g., the third metal ions). Specifically, the organic component is added to the first extraction liquid and two phases will form (the organic component is substantially immiscible with the first extraction liquid, which is aqueous), one phase comprising the second metal ions and the other phase comprising the third metal ions. Organic components contemplated herein include hydroxyoximes such as ACORGA® M5774 metal extraction reagent (Cytec Industries, Inc.) or the equivalent thereof. The addition of the organic component to the first extraction liquid preferably substantially separates a second metal ion from the first extraction liquid into a fraction that can be further processed to reclaim said metal. For example, referring to FIG. 3, the aqueous phase can comprise the silver ions and the organic phase can comprise copper ions. The pH of the aqueous phase comprising the silver ions can be ramped to a range from about 6 to about 12, preferably about 9 to about 11, as described hereinabove, wherein the silver ions are substantially separable from other metals in the aqueous phase which readily formed hydroxide solids in the presence of a pH adjusting agent. Following separation of the pH ramp solid from the pH ramp liquid, the silver ions in the pH ramp liquid can be reduced to obtain silver metal. The third metal ions can be extracted out of the organic phase into an aqueous phase and the aqueous phase comprising the third metal ions can be reduced to obtain the copper metal. The extraction of the copper ions from the organic phase can be effectuated using dilute sulfuric acid.

Reduction of the metal ions to solid, high purity metals is well known to the skilled artisan. Preferably, the reducing agent is a so-called environmentally friendly chemical. Moreover, preferably the reduction occurs rapidly with minimal heating requirements. For example, preferred reducing agents include, but are not limited to, ascorbic acid, diethyl malonate, sodium metabisulfite, polyphenon 60, glucose and sodium citrate.

Accordingly, another embodiment relates to a method of removing more than one metal from e-waste as illustrated in FIG. 3, said method comprising:
(a) contacting the e-waste with a first metal digestion composition to form a first extraction liquid and a first extraction solid;
(b) separating the first extraction solid from the first extraction liquid;
(c) contacting the first extraction solid with a second metal digestion composition to form a second extraction liquid and a second extraction solid;
(d) separating the second extraction solid from the second extraction liquid, wherein the second extraction liquid comprises first metal ions; and
(e) contacting the first extraction liquid with an organic component that is immiscible with the first extraction liquid to separate second metal ions from third metal ions.

Yet another embodiment relates to a method of removing more than one metal from e-waste as illustrated in FIG. 3, said method comprising:
(a) contacting the e-waste with a first metal digestion composition to form a first extraction liquid and a first extraction solid;
(b) separating the first extraction solid from the first extraction liquid;
(c) contacting the first extraction solid with a second metal digestion composition to form a second extraction liquid and a second extraction solid;
(d) separating the second extraction solid from the second extraction liquid, wherein the second extraction liquid comprises first metal ions;
(e) contacting the first extraction liquid with an organic component that is immiscible with the first extraction liquid to separate second metal ions from third metal ions; and
(f) reducing the first metal ions to a first metal, the second metal ions to a second metal, and the third metal ions to a third metal.

The compositions described herein are easily formulated by simple addition of the respective ingredients and mixing to homogeneous condition. Furthermore, the compositions may be readily formulated as single-package formulations or multi-part formulations that are mixed at or before the point of use, e.g., the individual parts of the multi-part formulation may be mixed at the tool or in a storage tank upstream of the tool. The concentrations of the respective ingredients may be widely varied in specific multiples of the composition, i.e., more dilute or more concentrated, and it will be appreciated that the compositions described herein can variously and alternatively comprise, consist or consist essentially of any combination of ingredients consistent with the disclosure herein.

Using the methods described herein, greater than 90 wt % of the metals in the e-waste can be reclaimed.

In another aspect, the methods described herein can be used in the mining industry to separate metals from ores. For example, instead of starting with e-waste, the original material to be extracted using the first metal digestion composition is an ore or some other product of the mining industry.

In another aspect, a method of removing a metal from e-waste is described, said method comprising contacting the e-waste with a composition under conditions to extract a metal ion from said e-waste into an extraction composition, wherein said composition comprises, consists of, or consists essentially of at least one oxidizing agent, at least one complexing agent, and at least one catalyst. Suitable oxidizing agent(s), complexing agent(s) and catalyst(s) have been described herein. In one embodiment, the composition comprises, consists of, or consists essentially of hydrochloric acid, hydrogen peroxide, and a glycol or glycol ether. In another embodiment, the composition comprises, consists of, or consists essentially of hydrochloric acid, hydrogen peroxide, and diethylene glycol monobutyl ether. In a preferred embodiment, the method further comprises separating the extraction composition comprising the metal ion from the solid e-waste. Solid metal can be obtained by reducing the metal ion in the extraction composition (e.g., with a reducing agent suitable for such purpose). In an embodiment, the e-waste treated with the extraction compositions described herein may contain two or more different metals.

In still another aspect, a method of removing a metal from e-waste is described, said method comprising: (a) contacting the e-waste with a composition under conditions to extract a metal ion from said e-waste into an extraction composition; (b) separating the extraction composition comprising the metal ion from the solid e-waste; and (c) obtaining solid metal from the extraction composition comprising the metal ion, wherein said composition comprises, consists of, or consists essentially of at least one oxidizing agent, at least one complexing agent, and at least one catalyst. Suitable oxidizing agent(s), complexing agent(s) and catalyst(s) have been described herein. In one embodiment, the composition comprises, consists of, or consists essentially of hydrochloric acid, hydrogen peroxide, and a glycol or glycol ether. In another embodiment, the composition comprises, consists of, or consists essentially of hydrochloric acid, hydrogen peroxide, and diethylene glycol monobutyl ether. Solid metal can be obtained by reducing the metal ion in the extraction composition (e.g., with a reducing agent suitable for such purpose). In an embodiment, the e-waste treated with the extraction compositions described herein may contain two or more different metals.

In another aspect, a method of separating a first metal from at least a second metal, said method comprising contacting a material comprising the first and second metal with a composition under conditions to extract a first metal ion from said material into an extraction composition, wherein said composition comprises, consists of, or consists essentially of at least one oxidizing agent, at least one complexing agent, and at least one catalyst. Suitable oxidizing agent(s), complexing agent(s) and catalyst(s) have been described herein. In one embodiment, the composition comprises, consists of, or consists essentially of hydrochloric acid, hydrogen peroxide, and a glycol or glycol ether. In another embodiment, the composition comprises, consists of, or consists essentially of hydrochloric acid, hydrogen peroxide, and diethylene glycol monobutyl ether. In another aspect, the method further comprises separating the extraction composition comprising the first metal ion from the material. Solid first metal can be obtained by reducing the first metal ion in the extraction composition (e.g., with a reducing agent suitable for such purpose).

In another aspect, a method of separating a first metal from at least a second metal, said method comprising: (a) contacting a material comprising the first and second metal with a composition under conditions to extract a first metal ion from said material into an extraction composition; (b) separating the extraction composition comprising the first metal ion from the material; and (c) obtaining a solid first metal from the first metal ion, wherein said composition comprises, consists of, or consists essentially of at least one oxidizing agent, at least one complexing agent, and at least one catalyst. Suitable oxidizing agent(s), complexing agent(s) and catalyst(s) have been described herein. In one embodiment, the composition comprises, consists of, or consists essentially of hydrochloric acid, hydrogen peroxide, and a glycol or glycol ether. In another embodiment, the composition comprises, consists of, or consists essentially of hydrochloric acid, hydrogen peroxide, and diethylene glycol monobutyl ether. Solid first metal can be obtained by reducing the first metal ion in the extraction composition (e.g., with a reducing agent suitable for such purpose).

The features and advantages of the invention are more fully shown by the illustrative examples discussed below.

EXAMPLE 1

The first extraction of e-waste using variations of the first metal digestion composition described herein was performed. The e-waste was ground into a course powder. Single and multiple digestions of the powder were performed in duplicate and the first extraction compositions and the first extraction solids were analyzed using Inductively Coupled Plasma Mass Spectrometry (ICP-MS). All digestions were performed using 500 mg-10 g powder in 10 mL-200 mL of first metal digestion composition. Agitation occurred throughout the digestions. Digestion times ranged from about 30 minutes to about 135 minutes at temperatures in a range from about room temperature to about 50° C.

The first metal digestion compositions tested were as follows:

Formulation A: Aqua regia (Control, 3:1 HCl:HNO3)
Formulation B: 37% HCl:30% H2O2 (90%:10% by vol.)
Formulation C: 37% HCl:30% H2O2 (90%:10% by vol.) with NH$_4$Cl or NH$_4$SCN
Formulation D: 37% HCl:30% H2O2 (90%:10% by vol.+ 0.75 vol. % DEGBE)
Formulation E: 37% HCl:30% H2O2 (90%:10% by vol.+ 0.75 vol. % propylene glycol)
Formulation F: 37% HCl:30% H2o2 (90%:10% by vol.+ 0.75 vol. % DPGBE)
Formulation G: Etidronic acid+DEGBE (99%:1% by vol.)
Formulation H: 1:1:6 H$_2$SO$_4$:H$_2$O$_2$:H$_2$O
Formulation I: 37% HCl:30% H2O2 (90%:10% by vol.+ 0.5 vol. % DEGBE)
Formulation J: 37% HCl:30% H2O2 (90%:10% by vol.+1 vol. % DEGBE)
Formulation K: 95% H$_2$SO$_4$:30% H$_2$O$_2$ (90%:10% by vol.)

Formulation L: 95% $H_2SO_4$:30% $H_2O_2$ (90%:10% by vol.+0.75 vol. % DEGBE

Formulation M: 37% HCl:30% H2O2 (90%:10% by vol.+ 25 vol. % DEGBE)

Formulation N: 75 vol. % Etidronic acid+25 vol. % DEGBE

Formulation O: Etidronic acid+DEGBE+$NH_4Cl$ (94%:1%:5% by vol.)

Experimental results for the extraction of gold, silver and copper from e-waste using the methods described herein and the formulations are shown in Table 1 below. The aqua regia (formulation A) result was normalized to allow for easy comparison to other digests.

TABLE 1

Metal extraction efficiencies relative to aqua regia (formulation A).

| Formulation | Conditions | Au/ppm | Ag/ppm | Cu/ppm |
|---|---|---|---|---|
| A | 100° C., 60 min | 100% | 100% | 100% |
| B | room temperature (RT), 30 min, small scale* | 101% | 36% | 32% |
| B | 50° C., 30 min, small scale | 54% | 54% | 66% |
| I | RT, 30 min, small scale | 126% | 71% | 44% |
| I | 50° C., 30 min, small scale | 42% | 40% | 57% |
| J | RT, 30 min, small scale | 132% | 90% | 72% |
| J | 50° C., 30 min, small scale | 0% | 79% | 95% |
| H | 50° C., 30 min, small scale | 0% | 8% | 58% |
| K | 50° C., 30 min, small scale | 0% | 2% | 1% |
| D | RT, 30 min, small scale | 55% | 40% | 33% |
| D | 50° C., 30 min, small scale | 14-16% | 81-83% | 46-100% |
| D | RT, 135 min, small scale, serial extraction (total) | 198% | 111% | 50% |
| D | 50° C., 135 min, large scale, † serial extraction (total) | 24-42% | 57-83% | 63-77% |
| E | RT, 30 min, small scale | 164% | 101% | 71% |
| E | 50° C., 30 min, small scale | 38% | 26% | 24% |
| F | RT, 30 min, small scale | 106% | 31% | 23% |
| F | 50° C., 30 min, small scale | 0% | 62% | 71% |

*small scale is 500 mg e-waste + 10 mL digestion formulation
† large scale is 10 g e-waste + 200 mL digestion formulation It can be seen that a variety of digestion methods yielded greater than 90% extraction efficiency of one or more metals relative to aqua regia (formulation A). Values greater than 100% indicated an extraction efficiency greater than aqua reqia for that metal. Multiple extractions can result in 100% recovery of Au, Ag and Cu relative to aqua regia.

It can be seen that formulations and reaction conditions can be selected to ensure the selective extraction of silver and copper ions relative to gold. For example, the first extraction can be carried out using formulation J as the first metal digestion composition at 50° C. for 30 minutes and silver ions and copper ions are extracted with 79% and 95% efficiency, respectively (relative to aqua regia), while no gold is extracted. Clean formulation J can then be used as the second metal digestion composition at room temperature for 30 minutes and gold ions can be readily extracted from the e-waste. In another alternative, the first metal digestion composition can be formulation F at 50° C. for 30 minutes while the second metal digestion composition can be clean formulation F at room temperature for 30 minutes. It should be appreciated that these are just examples to demonstrate that it is possible to formulate a digestion composition and select the appropriate temperature and time to selectively extract metal ions relative to gold for the first extraction step described herein.

An alternative way to determine the efficiency of metal extraction is to determine the total mass of a single metal extracted into the liquid relative to the total mass of that metal in the e-waste powder. In this method, the e-waste powder is digested and then the liquid is separated from the solid, the liquid and solid are both analyzed to determine their metal contact, and the percent metal in the liquid relative to the total amount of metal in the e-waste calculated. If the extraction is highly efficient, the metals of interest should be found in the liquid, having been extracted from the solid. Results are shown in Table 2.

TABLE 1

Metal extraction efficiencies relative to the total mass of the metal extracted.

| Formulation | Conditions | Au/ppm | Ag/ppm | Cu/ppm |
|---|---|---|---|---|
| M | 50° C., 30 min, small scale* | 47% | 47% | 9% |
| I | room temperature (RT), 30 min, small scale | 61% | 74% | 87% |
| I | 50° C., 30 min, small scale | 23% | 84% | 99% |
| J | RT, 30 min, small scale | 66% | 98% | 100% |
| J | 50° C., 30 min, small scale | 0% | 99% | 100% |
| E | RT, 30 min, small scale | 86% | 99% | 100% |
| E | 50° C., 30 min, small scale | 23% | 81% | 60% |
| F | RT, 30 min, small scale | 76% | 63% | 47% |
| D | 50° C., 30 min, large scale, † serial, 1st extraction | 0% | 69-88% | 98% |
| D | 50° C., 105 min, large scale, serial, total | 72-100% | 100% | 100% |
| H | 50° C., 30 min, small scale | 0% | 1% | 48% |
| L | 50° C., 30 min, small scale | 6% | 71% | 100% |
| L | 50° C., 30 min, small scale | 26% | 99% | 29% |
| G | 50° C., 30 min, small scale | 28% | 2% | 87% |
| N | 50° C., 30 min, small scale | 28% | 26% | 96% |
| N | 50° C., 30 min, small scale | 19% | 6% | 62% |
| O | 50° C., 30 min, small scale | 0% | 88% | 91% |

*small scale is 500 mg e-waste + 10 mL digestion formulation
† large scale is 10 g e-waste + 200 mL digestion formulation It can be seen that the most efficient extraction was the formulation D serial extraction, wherein the e-waste was digested in formulation D at 50° C. for 30 minutes, the digestion solution was removed, the remaining e-waste was digested in clean formulation D for another 75 min at 50° C., and the digestion solution removed.

EXAMPLE 2

Figure 4:
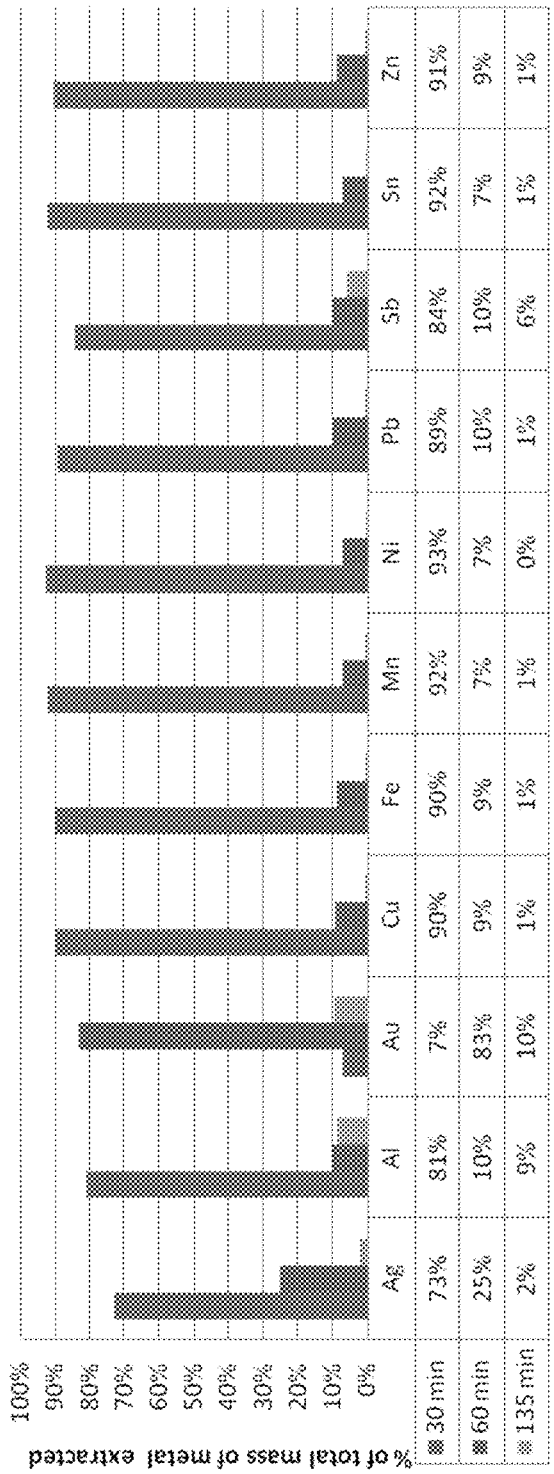
FIG. 4 illustrates the percentage of Ag, Al, Au, Cu, Fe, Mn, Ni, Pb, Sb, Sn and Zn extracted in small scale serial extractions using Formulation D as a function of the total mass of metal extracted.

Small scale serial extractions were performed using formulation D by extracting the e-waste at 50° C. for 30 minutes, followed by two additional extractions with clean formulation D for 30 min and 75 min. The results are shown in FIG. 4, wherein at 50° C. all metals except Au were strongly extracted in the first 30 minute extraction and 93% of the total mass of Au was extracted in the second 30 minute and third 75 minute extraction.

Figure 5:
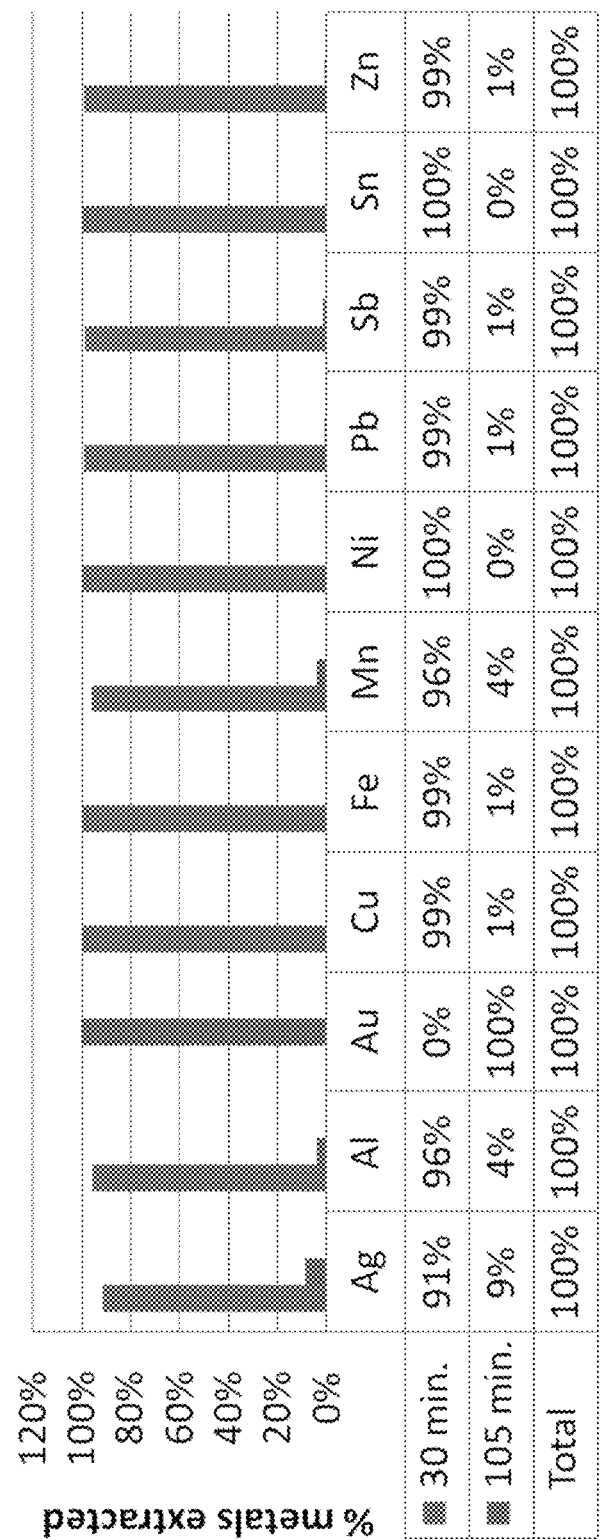
FIG. 5 illustrates the percentage of Ag, Al, Au, Cu, Fe, Mn, Ni, Pb, Sb, Sn and Zn extracted in large scale serial extractions using Formulation D as a function of the total mass of metal extracted.

Large scale serial extractions (scaled 20 times relative to the small scale serial extraction) were performed using formulation D by extracting the e-waste at 50° C. for 30 minutes, followed by an additional extraction with clean formulation D for 105 min. The results are shown in FIG. 5, wherein better separation of the Ag and Cu from the Au was achieved at the larger scale.

Accordingly, serial extractions could be used to separated Ag and Cu from Au.

Then, starting with an aliquot of the small scale first extraction liquid of this example (formulation D, 50° C., 30 minutes), which is substantially devoid of Au, NaOH was added dropwise (see, e.g., FIG. 2, pH ramp). A precipitate formed at about pH 6. Both the precipitate (pH ramp solid at pH 6) and remaining liquid (pH ramp liquid at pH 10) were analyzed for metal ion content using ICP-MS. The results are shown in Table 3:

aqueous and one organic. Following separation of the layers, the aqueous layer was analyzed for metal ion content using ICP-MS. The results are shown in Table 5:

TABLE 5

Parts per million of metal ions in aqueous phase for small scale extraction.

|  | Au | Ag | Cu | Al | Fe | Mn | Ni | Pb | Sb | Sn | Zn |
|---|---|---|---|---|---|---|---|---|---|---|---|
| pH < 1, 50° C. | 24.19 | 94.10 | 100.57 | 143.02 | 9.11 | 122.72 | 125.97 | 131.84 | 87.90 | 93.08 | 150.27 |
| pH 4, 50° C. | 0 | 112.18 | 14.95 | 184.25 | 93.80 | 94.82 | 97.00 | 24.85 | 92.50 | 86.32 | 49.13 |
| pH < 1, RT | 13.98 | 101.61 | 103.07 | 113.49 | 5.12 | 97.89 | 99.67 | 111.94 | 57.15 | 67.72 | 100.06 |
| pH 4, RT | 0 | 98.26 | 8.45 | 171.97 | 80.81 | 84.41 | 86.97 | 19.03 | 76.09 | 69.50 | 42.73 |

TABLE 3

Parts per million of metal ions in pH ramp solid relative to pH ramp liquid for small scale extraction.

|  | Au | Ag | Cu | Al | Fe | Mn | Ni | Pb | Sb | Sn | Zn |
|---|---|---|---|---|---|---|---|---|---|---|---|
| pH ramp liquid | 0 | 88 | 0 | 0 | 0 | 64 | 42 | 0 | 2 | 0 | 6 |
| pH ramp solid | 0 | 12 | 100 | 100 | 100 | 36 | 58 | 100 | 98 | 100 | 93 |

It can be seen that with the small scale extraction pH ramp that the pH ramp liquid contained mostly Ag (82%) while the precipitate contained 100% of the copper and most of the remaining metals.

Then, starting with an aliquot of the large scale first extraction liquid of this example (formulation D, 50° C., 30 minutes), which is substantially devoid of Au, NaOH was added dropwise. A precipitate formed at about pH 6. Both the precipitate (pH ramp solid at pH 6) and remaining liquid (pH ramp liquid at pH 12) were analyzed for metal ion content using ICP-MS. The results are shown in Table 4:

TABLE 3

Parts per million of metal ions in pH ramp solid relative to pH ramp liquid for large scale extraction.

|  | Au | Ag | Cu | Al | Fe | Mn | Ni | Pb | Sb | Sn | Zn |
|---|---|---|---|---|---|---|---|---|---|---|---|
| pH ramp liquid | 0 | 100 | 1 | 100 | 0 | 0 | 0 | 0 | 0 | 84 | 0 |
| pH ramp solid | 0 | 0 | 99 | 0 | 100 | 100 | 100 | 0 | 100 | 16 | 100 |

It can be seen that with the large scale extraction pH ramp that the pH ramp liquid contained 100% Ag while the precipitate contained 99% of the copper and most of the remaining metals.

Alternatively, an organic component can be combined with the first extraction liquid to enable selective precipitation of desired metal ions (see, e.g., FIG. 3, add additive). An organic component of interest is M-5774, which is a proprietary mixture of oximes and aldoximes which is selective for Cu ions and phase separates from aqueous solutions. The organic layer extracts Cu ions from aqueous solutions comprising same. Following extraction into M-5774, copper ions can be recovered from the organic M-5774 layer using a dilute sulfuric acid wash.

Starting with an aliquot of the small scale first extraction liquid of this example (formulation D, 50° C., 30 minutes), which is substantially devoid of Au, M-5774 was added under different pH and temperature conditions for 30 minutes (see, e.g., FIG. 3, add additive). Two layers were created, one It can be seen that with the small scale extraction, at pH 4 and room temperature, Ag (98%) can be selectively extracted from Cu (8%).

EXAMPLE 3

Once separated, for example as described in the description herein, the metal ions are preferably reduced to metal solid. Preferably, the reducing agent is a so-called environmentally friendly chemical. Moreover, preferably the reduction occurs rapidly with minimal heating requirements.

In order to gauge effectiveness of the reducing agents, the reduction of standard solutions of $Au^{+3}$ (ICP gold standard in dilute HCl (approximately 0.05 M)), $Ag^+$ (1 M $AgNO_3$) and $Cu^{+2}$ (1 M $CuSO_4$) was performed. Environmentally friendly reducing agents were added to the standard solutions and time, temperature and pH were controlled. The pH was adjusted by adding HCl, $NaHCO_3$ or NaOH before or after addition of the environmentally friendly reducing agent. The pH of the solutions influences the oxidation state of the metal ion and therefore the potential for reduction to the metal solid. The initial amount of metal ion in the solution and the final amount of solid collected following the reduction were compared to determine percent recovery.

Six environmentally friendly chemical reducing agents were tested: ascorbic acid, diethyl malonate, sodium metabisulfite, polyphenon 60 (P60, green tea extract), D-glucose and sodium citrate, as will be discussed individually below.

Ascorbic Acid

Ascorbic acid (AA) was added to each of the $Au^{3+}$, $Ag^+$ and $Cu^{2+}$ solutions at the conditions disclosed in Table 6 and room temperature for less than 1 hour and the solids recovered were analyzed using ICP-MS to test for purity. The results are shown in Table 6.

TABLE 6

Ascorbic acid reduction results

| Metal Ion | Conditions | Recovered? | Elemental Analysis | Notes |
|---|---|---|---|---|
| $Au^{+3}$ | $Au^{3+}$ in soln at pH 1, AA soln at pH 1 | Brown solid formed, 104% | 98% Au | High purity formation of Au(s) |
| $Au^{+3}$ | $Au^{3+}$ in soln at pH 1, AA soln at pH 5.5 | Brown solid formed, 103% | 87% Au | Au(s) formation, likely contains trace salts |
| $Au^{+3}$ | $Au^{3+}$ in soln at pH 7, AA soln at pH 5.5 + base (NaOH) | Brown solid formed, 107% | 73% Au | Likely contains oxide and chloride salts |

TABLE 6-continued

Ascorbic acid reduction results

| Metal Ion | Conditions | Recovered? | Elemental Analysis | Notes |
|---|---|---|---|---|
| $Au^{+3}$ | $Au^{3+}$ in soln at pH 10, AA soln at pH 5.5 + base (NaOH) | Brown solid formed, 113% | 39% Au | Likely contains oxide and chloride salts |
| $Ag^+$ | $Ag^+$ in soln at pH 7, AA soln at pH 1 | Gray solid formed, 103% | 70% Ag | Likely contains oxide and chloride salts |
| $Ag^+$ | $Ag^+$ in soln at pH 7, AA soln at pH 5.5 | Dark gray solid formed, 111% | 56% Ag | Likely contains oxide salts |
| $Cu^{2+}$ | $Cu^{2+}$ in soln at pH 1, AA soln at pH 5.5 | Red-orange solid, 98% | 78% Cu | Likely contains chloride salts |
| $Cu^{2+}$ | $Cu^{2+}$ in soln at pH 7, AA soln at pH 5.5 | Copper colored solid, 110% | 98% Cu | High purity formation of Cu(s) |

It can be seen that high purity Au and Cu was recovered using ascorbic acid in less than one hour.

Diethyl Malonate

Diethyl malonate is not miscible with aqueous solutions and Au can be selectively extracted into the organic layer, forming the $CH_2(COOC_2H_5)Au(H_2O)_4Cl_3$ complex at low pH. Thereafter, the organic extract containing the Au can be washed by mixing with $HNO_3$ to remove impurities and then $FeSO_4$ at 80° C. can be used to reduce to Au metal.

Diethyl malonate (DEM) was added to each of the $Au^{3+}$, $Ag^+$ and $Cu^{2+}$ solutions at the conditions disclosed in Table 7 and room temperature for less than 1 hour and the solids recovered were analyzed using ICP-MS to test for purity. The results are shown in Table 7.

TABLE 7

Diethyl malonate reduction results

| Metal Ion | Conditions | Recovered? | Elemental Analysis | Notes |
|---|---|---|---|---|
| $Au^{+3}$ | $Au^{3+}$ in soln at pH 1 | No solid formed | N/A | Au move to DEM layer |
| $Au^{+3}$ | $Au^{3+}$ in soln at pH 7 | Brown solid formed | 87% Au | Au(s) formed, may contain oxide or chloride salts |
| $Au^{+3}$ | $Au^{3+}$ in soln at pH 10, 50° C. for 20 min | Light yellow solid formed, 94% | 93% Au | Au(s) formed, may contain oxide or chloride salts |
| $Au^{+3}$ | $Au^{3+}$ in soln at pH 10, 50° C. for 150 min | Yellow solid formed, 55% | 56% Au | Likely contains oxide or chloride salts |
| Ag | $Ag^+$ in soln at pH 4 | No solid formed | N/A | Two clear layers |
| $Cu^{2+}$ | $Cu^{2+}$ in soln at pH 1 | No solid formed | N/A | Addition of DEM formed two layers |
| $Cu^{2+}$ | $Cu^{2+}$ in soln at pH 7 | No solid formed | N/A | Addition of DEM formed two layers |
| $Cu^{2+}$ | $Cu^{2+}$ in soln at pH 10 | No solid formed | N/A | Precipitate formed upon NaOH addition, $Cu(OH)_2$ |

It can be seen that diethyl malonate was more effective for Au reduction, relative to either Ag or Cu.

Sodium Metabisulfite

Sodium metabisulfite (SMB) was added to each of the $Au^{3+}$, $Ag^+$ and $Cu^{2+}$ solutions at the conditions disclosed in Table 8 and room temperature for less than 1 hour and the solids recovered were analyzed using ICP-MS to test for purity. The results are shown in Table 8.

TABLE 8

Sodium metabisulfite reduction results

| Metal Ion | Conditions | Recovered? | Elemental Analysis | Notes |
|---|---|---|---|---|
| $Au^{+3}$ | $Au^{3+}$ in soln at pH 1 | Yellow solid formed | 95% Au | High purity formation of Au(s) |
| $Au^{+3}$ | $Au^{3+}$ in soln at pH 7 | Au mirror observed at >3 hr, 142% | 97% Au | High purity formation of Au(s) |
| $Au^{+3}$ | $Au^{3+}$ in soln at pH 10 | Au mirror formed at >3 hr, 140% | 36% Au | 36% Au(s) + 64% SMB contamination |
| $Ag^+$ | $Ag^+$ in soln at pH 1 | White solid (AgCl) formed, 90% | N/A | AgCl forms when adjusted to pH 1 with HCl |
| $Ag^+$ | $Ag^+$ in soln at pH 4 | White solid formed, 92% | 61% Ag | 61% Ag(s) + 39% SMB contamination |
| $Ag^+$ | $Ag^+$ in soln at pH 7 | White solid formed, 106% | 48% Ag | 48% Ag(s) + 52% SMB contamination |
| $Ag^+$ | $Ag^+$ in soln at pH 10 | Brown solid formed, solid turned white with SMB addition, 106% | 50% Ag | 50% Ag(s) + 50% SMB contamination |
| $Cu^{2+}$ | $Cu^{2+}$ in soln at pH 1 | White solid formed, 24% | 33% Ag | 33% Cu(s) + 67% SMB contamination |
| $Cu^{2+}$ | $Cu^{2+}$ in soln at pH 7 | White solid formed, 30% | 53% Ag | Likely contains Cu oxide salt |
| $Cu^{2+}$ | $Cu^{2+}$ in soln at pH 10 | Blue solid formed, solid turned brown with SMB addition, 70% | 28% Ag | 28% Cu(s) + 72% SMB contamination |

It can be seen that sodium metabisulfite was more effective for Au reduction, relative to either Ag or Cu.

Polyphenon 60

Polyphenon 60 (P60) was added to each of the $Au^{3-}$, $Ag^+$ and $Cu^{2+}$ solutions at the conditions disclosed in Table 9 and room temperature and the solids recovered were analyzed using ICP-MS to test for purity. The results are shown in Table 9.

TABLE 9

P60 reduction results

| Metal Ion | Conditions | Recovered? | Elemental Analysis | Notes |
|---|---|---|---|---|
| $Au^{+3}$ | $Au^{3+}$ in soln at pH 1 | Red solid started to form after 15 min | 32% | |
| $Ag^+$ | $Ag^+$ in soln at pH 4 | Silver mirror formed after 15 min, 25% at >4 hr | 100% | Ag(s) formed at high purity. Ag continues to fall out of solution over time. |
| $Cu^{2+}$ | $Cu^{2+}$ in soln at pH 7 | No solid formed | N/A | |

It can be seen that P60 was more effective for Ag reduction, relative to either Au or Cu.

Glucose

Glucose was added to each of the $Au^{3+}$, $Ag^+$ and $Cu^{2+}$ solutions at the conditions disclosed in Table 10 and the solids recovered were analyzed using ICP-MS to test for purity. The results are shown in Table 10.

TABLE 10

Glucose reduction results

| Metal Ion | Conditions | Recovered? | Elemental Analysis | Notes |
|---|---|---|---|---|
| $Au^{+3}$ | $Au^{3+}$ in soln at pH 1 (RT) | No solid formed | N/A | |
| $Au^{+3}$ | $Au^{3+}$ in soln at pH 1 (100° C.) | No solid formed | N/A | |
| $Au^{+3}$ | $Au^{3+}$ in soln with addition of NaOH (RT) | Red-brown solid formed immediately, Au flakes observed, 83% | N/A | Au continues to fall out of soln over time |
| $Ag^+$ | $Ag^+$ in soln at pH 4 (RT) | No solid formed | N/A | |
| $Ag^+$ | $Ag^+$ in soln at pH 4 (100° C.) | Ag mirror forms | 23% | 23% Ag(s) + 67% glucose |
| $Cu^{2+}$ | $Cu^{2+}$ in soln at pH 7 (RT) | No solid formed | N/A | |
| $Cu^{2+}$ | $Cu^{2+}$ in soln at pH 7 (100° C.) | No solid formed | N/A | |

Ag and Au solids formed using glucose as a reducing agent, wherein Au required the presence of a base and Ag required high temperatures (100° C.).

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art, based on the disclosure herein. The invention therefore is to be broadly construed, as encompassing all such variations, modifications and alternative embodiments within the spirit and scope of the claims hereafter set forth.

What is claimed is:

1. A method of removing more than one metal from e-waste, said method comprising:
   (a) contacting the e-waste with a first metal digestion composition to form a first extraction liquid and a first extraction solid;
   (b) separating the first extraction solid from the first extraction liquid;
   (c) contacting the first extraction solid with a second metal digestion composition to form a second extraction liquid and a second extraction solid;
   (d) separating the second extraction solid from the second extraction liquid, wherein the second extraction liquid comprises gold ions; and
   (e) contacting the first extraction liquid with an additive to separate silver ions from copper ions,
   wherein the first and second metal digestion compositions are devoid of nitric acid and cyanide-containing compounds, and wherein the additive is a pH adjusting agent wherein the pH of the first extraction liquid is raised to a pH in a range from 6 to 12.

2. The method of claim 1, wherein the e-waste has been pulverized to powder, shredded, crushed to expose the metals, or a combination thereof.

3. The method of claim 1, wherein the method is carried out at temperature in a range from about 20° C. to about 70° C.

4. The method of claim 1, wherein the first extraction liquid is the same as or different than the second extraction liquid.

5. The method of claim 1, wherein the first extraction liquid comprises at least one chelating agent and at least one oxidizing agent.

6. The method of claim 5, wherein the first extraction liquid further comprises at least one catalyst.

7. The method of claim 1, wherein the second extraction liquid comprises at least one chelating agent and at least one oxidizing agent.

8. The method of claim 7, wherein the second extraction liquid further comprises at least one catalyst.

9. The method of claim 5, wherein the at least one chelating agent comprises hydrochloric acid or sulfuric acid.

10. The method of claim 7, wherein the at least one chelating agent comprises hydrochloric acid or sulfuric acid.

11. The method of claim 5, wherein the at least one oxidizing agent comprises hydrogen peroxide.

12. The method of claim 6, wherein the at least one catalyst comprises at least one glycol compound comprising a species selected from the group consisting of ethylene glycol, propylene glycol, butylene glycol, dipropylene glycol, and combinations thereof, or at least one glycol ether compound selected from the group consisting of diethylene glycol monomethyl ether, triethylene glycol monomethyl ether, diethylene glycol monoethyl ether, triethylene glycol monoethyl ether, ethylene glycol monopropyl ether, ethylene glycol monobutyl ether, diethylene glycol monobutyl ether, triethylene glycol monobutyl ether, ethylene glycol monohexyl ether, diethylene glycol monohexyl ether, ethylene glycol phenyl ether, propylene glycol methyl ether, dipropylene glycol methyl ether (DPGME), tripropylene glycol methyl ether, dipropylene glycol dimethyl ether, dipropylene glycol ethyl ether, propylene glycol n-propyl ether, dipropylene glycol n-propyl ether (DPGPE), tripropylene glycol n-propyl ether, propylene glycol n-butyl ether, dipropylene glycol n-butyl ether, tripropylene glycol n-butyl ether, propylene glycol phenyl ether, and combinations thereof.

13. The method of claim 8, wherein the at least one catalyst comprises at least one glycol compound comprising a species selected from the group consisting of ethylene glycol, propylene glycol, butylene glycol, dipropylene glycol, and combinations thereof, or at least one glycol ether compound selected from the group consisting of diethylene glycol monomethyl ether, triethylene glycol monomethyl ether, diethylene glycol monoethyl ether, triethylene glycol monoethyl ether, ethylene glycol monopropyl ether, ethylene glycol monobutyl ether, diethylene glycol monobutyl ether, triethylene glycol monobutyl ether, ethylene glycol monohexyl ether, diethylene glycol monohexyl ether, ethylene glycol phenyl ether, propylene glycol methyl ether, dipropylene glycol methyl ether (DPGME), tripropylene glycol methyl ether, dipropylene glycol dimethyl ether, dipropylene glycol ethyl ether, propylene glycol n-propyl ether, dipropylene glycol n-propyl ether (DPGPE), tripropylene glycol n-propyl ether, propylene glycol n-butyl ether, dipropylene glycol n-butyl ether, tripropylene glycol n-butyl ether, propylene glycol phenyl ether, and combinations thereof.

14. The method of claim 1, wherein the pH adjusting agent comprises hydroxide ions.

15. The method of claim 7, wherein the at least one oxidizing agent comprises hydrogen peroxide.

16. The method of claim 14, wherein the pH of the first extraction liquid is adjusted to pH in a range from about 9 to about 11.

17. The method of claim 14, wherein the silver ions are contained in a liquid fraction and the copper ions are contained in a solid fraction.

18. The method of claim 1, further comprising reducing the gold ions to gold metal.

19. The method of claim 1, further comprising reducing the silver ions to silver metal.

20. The method of claim 1, further comprising reducing the copper ions to copper metal.

* * * * *